D. E. WILLIAMS.

CARTRIDGES.

No. 7,783. Reissued July 3, 1877.

Witnesses:
Chas. J. Gill
Willis B. Magruder.

Inventor
David E. Williams
by his Attys.
Cox & Cox

UNITED STATES PATENT OFFICE.

DAVID E. WILLIAMS, OF QUINCY, ILLINOIS.

IMPROVEMENT IN CARTRIDGES.

Specification forming part of Letters Patent No. 108,543, dated October 18, 1870; Reissue No. 7,783, dated July 3, 1877; application filed May 21, 1877.

*To all whom it may concern:*

Be it known that I, DAVID E. WILLIAMS, late of the city of Davenport, in the State of Iowa, but now of the city of Quincy, in the county of Adams and State of Illinois, have invented certain new and useful Improvements in Cartridges; and I do hereby declare that the following is a full, clear, and exact description thereof, that will enable others skilled in the art to which it appertains to make and use the same, reference being had to the accompanying drawings, and to the letters of reference marked thereon, which form a part of this specification.

The invention relates to cartridges for breech-loading fire-arms; and consists in a concave spherical or conical chamber at the base of the shell or cartridge, and in the manner of forming such chamber, as hereinafter fully set forth.

Figure 1:
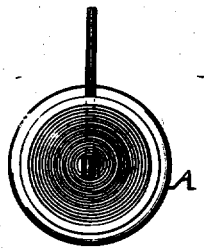
Figure 2:
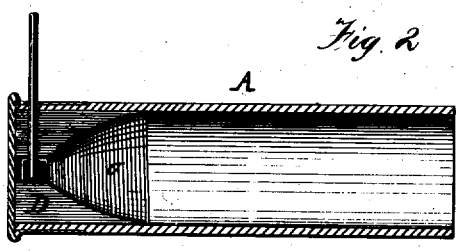
Figure 3:
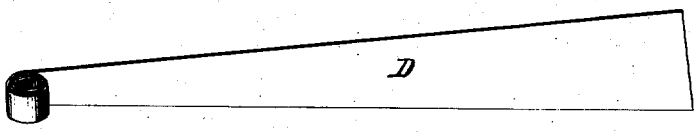

In the accompanying drawings, Figure 1 is a front-end view of a device embodying the elements of the invention. Fig. 2 is a longitudinal section of the same. Fig. 3 shows the strip and the manner of rolling it to form the breech.

The advantages of a spherical or conical breech in the chamber of fire-arms of all descriptions have long been recognized, and one of the greatest objections to the use of breech-loading arms arises from the fact that these advantages are lost by the use of the pasteboard cartridges as usually made, they being flat at the interior of their base.

The present invention is intended to obviate this objection by constructing the pasteboard cartridges with a conical or spherical chamber, and thus enable such cartridges to be used in breech-loading fire-arms with the same result as though such arms were formed with a spherical or conical chamber. Moreover, the present invention produces a separate chamber, formed in the manner hereinafter described, which chamber can be introduced with good results into any shell or cartridge having a flat base and vertical inner surfaces.

The body of the cartridge A is, in the present instance, formed of stiff pasteboard, though it is plain that it may be made of flexible material or of metal. To the part A is secured the usual flanged metallic head; or the part A may be attached to the rim or upper edge of the chamber and the metallic flange to its lower end.

To construct the chamber, a strip of paper or other suitable material, of the form shown at Fig. 3, is provided, the lower edge of which strip is straight, and its opposite edge inclined. This strip is rolled upon a stick or wire, commencing at its narrowest end, until the entire strip is rolled up. The stick or wire is then withdrawn, leaving at the center a priming space or tube of suitable size to receive a cap, and to lead the flame produced by the explosion thereof into the chamber at its center.

There is thus constructed a chamber or plug of any desired dimensions, each successive layer of the strip overlapping the preceding one, and extending beyond its edge, forming a conical chamber, the pitch of the sides of which is, respectively, less or greater, according as the edge of the strip is more or less inclined. This overlapping imparts great strength to the chamber, and it is plain that the plug thus formed can readily be introduced into any shell or cartridge suitably formed to receive it.

The strip D may be coated with paste when it is rolled or saturated with shellac, or merely dampened and then pressed into place by any suitable tool.

It is obvious that, instead of forming the chamber by thus rolling up a strip, paper-pulp may be inserted, and then pressed into form; or it may be formed up first in a mold or press and then inserted.

This improvement is equally applicable to the pin-cartridge, as shown in the drawings, as to those having the cap inserted from the rear at the center of the head, and known as the "central-fire cartridges."

By means of my improvement the ordinary cartridge-shells with a flat base may readily be converted into cartridges or shells having a conical chamber, all that is necessary being to cut the strip, roll it up or form the breech, and insert it, as set forth.

I am aware that it has been proposed to manufacture a cartridge of paper-pulp and farinaceous material with a spherical base to its chamber, and all forming one piece of material; and, also, to construct a metallic shell with a similar base to its chamber. I therefore do not claim such devices; nor do I claim a spherical chamber irrespective of the manner in which it is constructed; but What I do claim as my invention, and desire to secure by Letters Patent, is—

An artificial breech or chamber for cartridge-shells having a flat base, and the opposite edges overlapping each other, forming a conical chamber, as set forth.

In testimony that I claim the foregoing I have hereunto set my hand this 13th day of April, 1877.

DAVID E. WILLIAMS.

Witnesses:
W. H. KEATH,
J. B. GILPIN.